United States Patent [19]

Häring et al.

[11] Patent Number: 4,824,256
[45] Date of Patent: Apr. 25, 1989

[54] CO-ROTATING TWIN-SCREW KNEADERS WITH KNEADING DISKS

[75] Inventors: Erwin Häring, Stuttgart; Gerhard Weihrich; Wolfgang Wörz, both of Illingen, all of Fed. Rep. of Germany

[73] Assignee: Werner & Pfleiderer, Fed. Rep. of Germany

[21] Appl. No.: 844,456

[22] Filed: Mar. 26, 1986

Related U.S. Application Data

[63] Continuation-in-part of Ser. No. 684,454, Dec. 21, 1984, abandoned.

[30] Foreign Application Priority Data

Apr. 2, 1984 [DE] Fed. Rep. of Germany ....... 3412258

[51] Int. Cl.$^4$ .............................. B01F 7/08; B29B 7/48
[52] U.S. Cl. ...................................... 366/85; 366/301; 366/319
[58] Field of Search ...................... 366/85, 83, 84, 301, 366/82, 322, 319, 318; 425/204, 208, 209

[56] References Cited

U.S. PATENT DOCUMENTS

| | | | |
|---|---|---|---|
| 3,423,074 | 1/1969 | Loomans | 425/204 X |
| 3,446,485 | 5/1969 | Fischer | 366/301 X |
| 3,608,868 | 9/1971 | Koch | 366/82 |
| 4,040,607 | 8/1977 | Ullrich | 366/85 |
| 4,073,013 | 2/1978 | Blach | 366/301 X |
| 4,131,371 | 12/1978 | Tynan | 366/301 |
| 4,352,568 | 10/1982 | Lohr et al. | 366/84 |
| 4,416,544 | 11/1983 | Blach | 366/85 |

Primary Examiner—Harvey C. Hornsby
Assistant Examiner—Scott J. Haugland
Attorney, Agent, or Firm—Laff, Whitesel, Conte & Saret

[57] ABSTRACT

A co-rotating twin-screw kneader has a casing which has two axially parallel bores, defined by the casing wall and which intersect with one another in a region to form gussets in said casing wall adjacent the intersecting region. Two axially parallel shafts which are arranged to be driven in the same direction of rotation are each arranged in a respective one of the bores and multi-flight kneading disks having crests associated with the casing wall are mounted in non-rotary manner on at least part of the length of each shaft. Each kneading disk on one shaft is associated with another disk on the other shaft in a plane perpendicular to the axes of the shafts and the disks are arranged to be moved past one another in a virtually clearance-free manner in the intersecting region of the bores.

In order to achieve maximum flow rates and optimum melt homogeneity of material by using constructionally simple measures, the casing wall is dimensioned in such a way relative to the kneading disks, accompanied by the formation of a definite clearance between the casing wall and the crests on the kneading disk, but $$\frac{D_g}{a} \geq \frac{1}{\cos\frac{\pi}{2n}}$$

in which
$D_g$ = diameter of the bores
$a$ = center-to-center distance of the bores
$n$ = number of flights on each kneading disk.

9 Claims, 5 Drawing Sheets

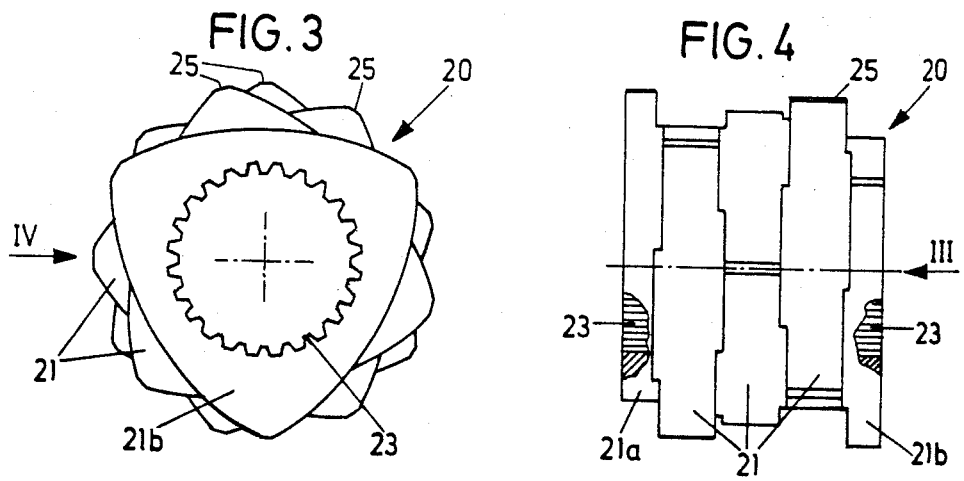
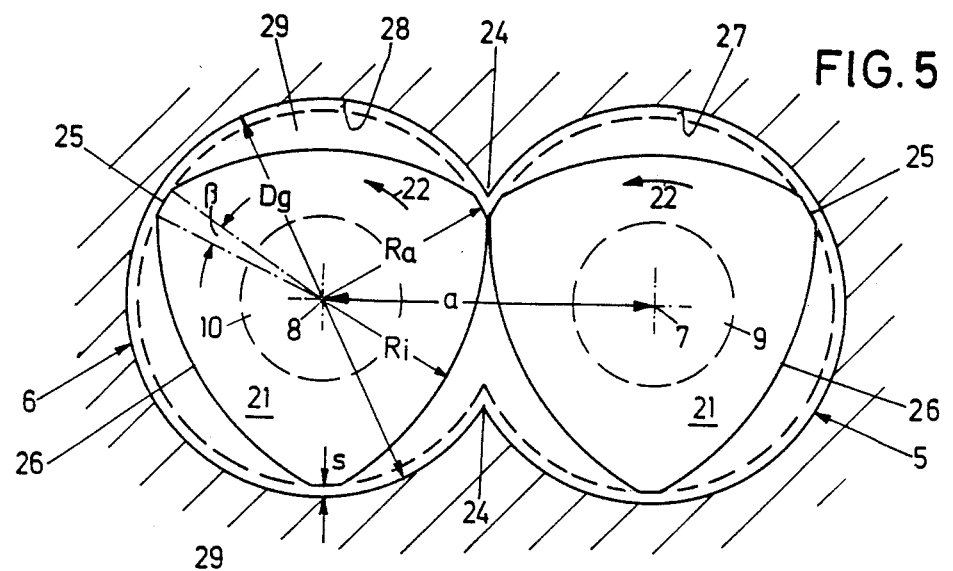
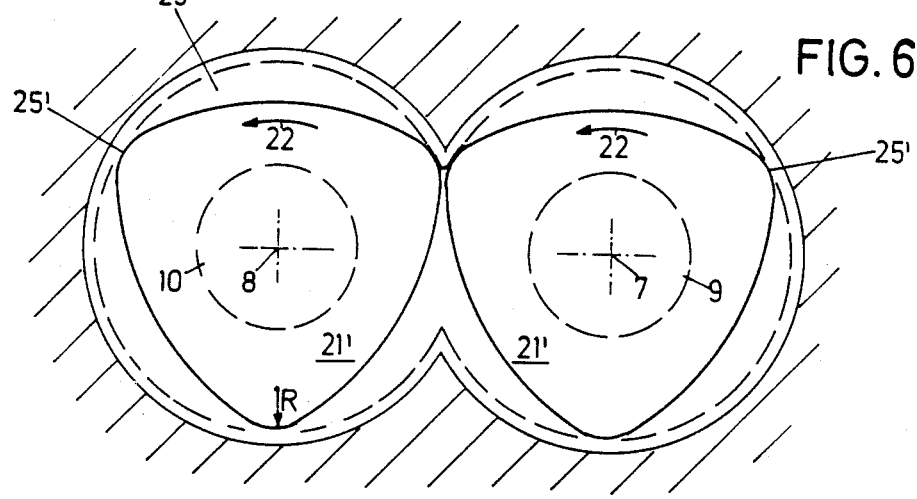

4,824,256

CO-ROTATING TWIN-SCREW KNEADERS WITH KNEADING DISKS

This is a continuation-in-part of our application Ser. No. 06/684,454 filed on Dec. 21, 1984 now abandoned.

FIELD OF THE INVENTION

This invention relates to a co-rotating twin-screw kneader with a casing having two axially parallel bores defined by the casing wall which intersect with one another in a region to form gussets in the casing wall adjacent the intersecting region, two axially parallel shafts arranged to be driven in the same direction of rotation, each shaft being arranged in a respective one of the bores, and multi-flight kneading disks provided with crests associated with the casing wall mounted on at least part of the length of each shaft.

BACKGROUND OF THE INVENTION

In connection with such twin-screw kneaders it is known to provide double-flight kneading disks, whose crests move in an approximately clearance-free manner past the casing wall. The disadvantage of these known twin-screw kneaders is that they do not have an optimum melting capacity for certain applications. The kneading zone formed from positively displaced kneading disks, i.e. comprising kneading disks arranged in a conveying-effective manner do not bring about a complete melting of the standard thermoplastic materials, such as polyolefins, styrene polymers, polyesters, polyethylenes, etc. In order to achieve this, it is necessary to provide baffle members in the form of constrictors or return conveying screws or kneading members. This has a negative influence on the feed performance, because material feed is prevented by the back pressure resulting from the baffle members. This is particularly the case when pulverulent materials with a low bulk density are used, so that the degree of filling is impaired. It also leads to unfavourable mechanical effects and specifically to local high wear, because the melting mainly takes place directly upstream of the baffle member, so that locally high torques are obtained in the melting zone.

It is also known to so correct such double-flight kneading disks on their crests and flanks that a clearance is formed between the kneading disks and the casing wall. This reduces the aforementioned disadvantages, but they are fundamentally still present. An additional disadvantage is the lack of self-cleaning.

It is known from European Patent Specification No. 0037984 in connection with a co-rotating twin-screw kneader to provide kneading disks constructed as eccentric disks with a circular cross-section. In the penetration area of the bores, a clearance is provided between two adjacent kneading disks, whilst there is also a clearance with respect to the casing wall and which is larger than the first-mentioned clearance. As these eccentric disks have a circular cross-section, they must be spaced from the casing wall in order to be able to operate.

European Patent Specification No. 0002131 discloses a twin-screw kneader with double-flight screws, in which in each case one screw thread runs in an approximately clearance-free manner with respect to the casing wall, whilst the other screw thread has a definite clearance with respect to the said wall. The two screws are associated with one another in such a way that a self-cleaning effect occurs. Each of the screws can have two to four flights.

A twin-screw kneader with co-rotating screw shafts is also known from U.S. Pat. No. 4,131,371, in which the screw threads are constructed in such a way that the profile centres are arranged on a helix, which winds around the screw axis. Such a construction is highly complicated from the design standpoint.

SUMMARY OF THE INVENTION

The invention is based on the finding that, in order to obtain an optimum operating result, very large Dg/a ratios are required. However, there are design barriers to achieving such ratios because in conventional twin-screw kneaders there are limitations with respect to the number of flights of the kneading disks and which are not desirable with a view to obtaining an optimum homogeneous, careful preparation. Dg is the diameter of the bore in the casing and a the centre-to-centre distance of the two bores.

The object of the invention is to provide a twin-screw kneader using constructionally simple measures whilst taking account of the above finding to obtain a maximum flow rate in the case of optimum melt homogeneity.

According to the invention, there is provided a co-rotating twin-screw kneader comprising a casing having two essentially axially parallel bores defined by the casing wall and which intersect with one another in a region to form gussets in said casing wall adjacent the intersecting region; two essentially axially parallel shafts arranged to be driven in the same direction of rotation, each shaft being arranged in a respective one of said bores; and at least one multi-flight kneading disk provided with crests associated with the casing wall being mounted on at least part of the length of each shaft, each said disk on one shaft being associated with another said disk on the other shaft in a plane perpendicular to the axes of said shafts and said disks being arranged to be moved past one another in a virtually clearance-free manner in the intersecting region of said bores; in which the casing wall is so dimensioned relative to the kneading disks, accompanied by the formation of a definite clearance between the casing wall and the crests on the kneading disks, that $$\frac{Dg}{a} \geq \frac{1}{\cos\frac{\pi}{2n}}$$

in which
  Dg = diameter of the bores
  a = centre-to-centre distance of the bores
  n = number of flights on each kneading disk.

According to a preferred embodiment of the invention, each kneading disk is provided with three flights whereby $$\frac{Dg}{a} \geq 1.155$$

The crest clearance provided according to the invention makes it possible to satisfy the aforementioned relationship whilst using a larger number of flights than in conventional constructions. A feed improvement is consequently obtained with a very good flow rate, because in the case of forward-conveying kneading disks no counterpressure is built up. It is then possible but not necessary to omit return-conveying members. Nevertheless, a clearly defined melting and a strong, uniform shearing is obtained. Melting is in particular possible with only a partial filling, because the air contained in the twin-screw kneader does not have a disadvantageous effect in that it can be drawn through in a problem-free manner, which is not the case if, as in conventional constructions, it were necessary to provide back pressure members for specific fields of application.

Thus, according to the invention, the known kneading disks geometry is retained, i.e. the optimum ratio of the maximum radius of the kneading disks to the centre-to-centre distance of the two shafts remains unchanged, so that sealing and consequently self-cleaning of two adjacent kneading disks in one plane is ensured.

Preferably, the clearance between the casing wall and the crests on the kneading disks is approximately 0.06 to 0.09 times the radius of the kneading disks to said crests. As a result of this measure, the number of flights and consequently the number of kneading zones can be increased, which leads to better kneading and better thorough mixing. Simultaneously the wedge angle between the casing wall and the associated flank of the particular crest is reduced so that once again more intense kneading is obtained. The material to be treated flows over the crests, so that each individual product particle is more frequently and more uniformly sheared and pressure peaks are avoided. As no back pressure is required, and no high local pressure peaks are built up, it is possible to work with a higher degree of filling, which leads to more intense thorough mixing and kneading.

BRIEF DESCRIPTION OF THE DRAWINGS

The invention will now be further described, by way of example, with reference to the drawings, in which:

FIG. 3 is a front view of several kneading disks combined on one piece in a kneading block taken in the direction of the arrow III in FIG. 4;

FIG. 4 is a side view of the kneading block taken in the direction of the arrow IV in FIG. 3;

FIG. 5 is a vertical section through the kneader shown in FIG. 1 with three-flight kneading disks;

FIG. 6 is a view corresponding to FIG. 5 with kneading disks rounded on the crests;

DETAILED DESCRIPTION OF THE PREFERRED EMBODIMENTS

Figure 1:
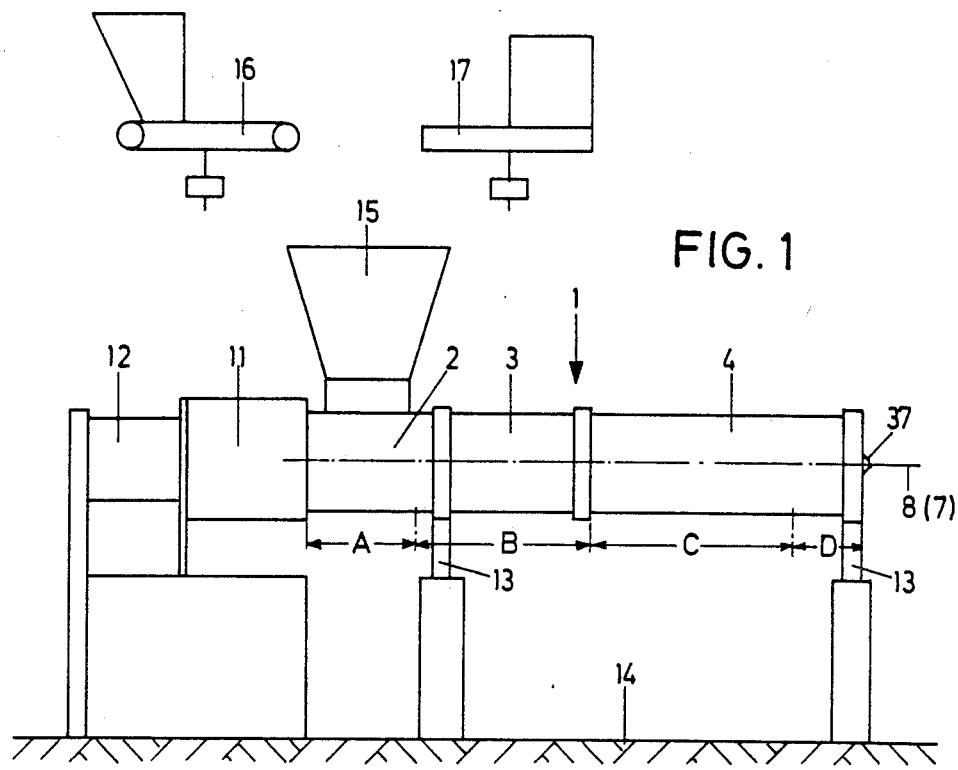
FIG. 1 is a diagrammatic side view of one embodiment of a co-rotating twin-screw kneader according to the invention.

The co-rotating twin-screw kneader shown in FIG. 1 has a casing 1, which comprises a plurality of portions 2, 3, 4, which are arranged in axial succession and are flanged together. Two axially parallel bores 5, 6 are formed in the casing and pass into one another in the manner of a horizontal figure of eight. Two shafts 9, 10 driven by a motor 12 via a gear 11 are mounted in the casing 1 concentrically to the axes 7, 8 of the bores 5, 6. The casing 1, as well as the gear 11 and motor 12 are supported with respect to the floor 14 by means of columns 13. Into the first casing portion 2 serving as the feed zone issues a feed hopper 15 into which is fed the material to be processed, e.g. by means of a feeder 16 constructed as a conveyor-type weigher, e.g. in the case of granular material and/or a feeder 17 constructed as a screw feeder, e.g. for powder. In the feed zone A in portion 2 and in the solid material conveying zone B formed in the next casing portion, the shafts 9, 10 are in each case provided with a screw body 19 having screw thread flights 18. In the fourth casing portion 4 is formed a kneading zone, in which are arranged in non-rotary manner kneading disks 21 combined to form kneading blocks 20 and positioned on the shafts 9, 10. The shafts 9, 10 are driven in the same direction corresponding to the rotation direction indicated by the arrows 22. This basic construction of co-rotating twin-screw kneaders is generally known and widely used, it naturally also being possible to provide further casing portions, as well as further kneading means. The kneading zone C is followed by a discharge zone D which is equally provided with screw bodies which are identical in their geometric formation to those of the solid material conveying zone B but which have in general less pitch.

As can be gathered from FIGS. 3 and 4, a kneading block 20 comprises five kneading disks 21, 21a, 21b constructed in one piece and which are tangentially displaced relative to one another by e.g. 30°. The two outer kneading disks 21a and 21b of a kneading block 20 have only half the axial extension as have the three inner kneading disks 21. All kneading disks 21, 21a, 21b have identical cross sections. As can be seen from FIG. 2 adjacent kneading blocks 20 are arranged to each other in such a way that the one kneading disk 21b of one kneading block is in alignment with the following kneading disk 21a. Thus, an optimal distribution of forces is achieved. Each kneading block 20 has inner teeth 23 by means of which it can be fitted in non-rotary manner to the correspondingly constructed shafts 9 or 10.

The two bores 5, 6 in the casing 1 have in each case a diameter Dg. The spacing a between the axes 7, 8 of the bores 5, 6 is smaller than the diameter Dg, because the two bores 5, 6 penetrate one another, accompanied by the formation of gussets 24.

The kneading disks shown in FIGS. 3, 5 and 6 are constructed in three-flight form, i.e. they each have three crests 25 arranged at the same angular distance from one another and which in the case of the construction of FIG. 5 are defined by a circular arc section with a generating angle of $\beta = 5°$ to $10°$. The crests are interconnected by curved sections shaped in this way, because when two associated kneading disks 21 revolve in the same direction in the rotation direction 22, crest 25 of the one kneading disk can move in substantially clearance-free manner past the curved section 26 of the other kneading disk 21 in the penetration zone of the bores 5, 6, i.e. between the gussets 24. Thus, the kneading disks 21 arranged in one plane clean one another. If the radius of the kneading disks 21 in the vicinity of the particular crest 25 is Ra, relating to the largest radius of the kneading disks 21, and if the smallest radius of the kneading disks 21 is Ri, relating to the spacing of the curved section 26 in the centre between two crests 25, then as a result of the aforementioned statements Ra+Ri=a.

The path of movement of the crests 25 in the vicinity of the casing walls 27, 28 defined by the bores 5, 6 is shown in broken line form in FIGS. 5 and 6. This illustrates that there is a definite crest clearance s between the crests 25 and the particular casing wall 27, 28, which is e.g. in the range $0.06\ Ra \leq s \leq 0.09\ Ra$.

The embodiment of FIG. 6 differs from that of FIG. 5 only in that the three-flight kneading disks 21' have crests 25' which are rounded, i.e. have a radius of curvature R. This leads to the additional advantage that the wedge flow over the crests 25' is increased.

Figure 7:
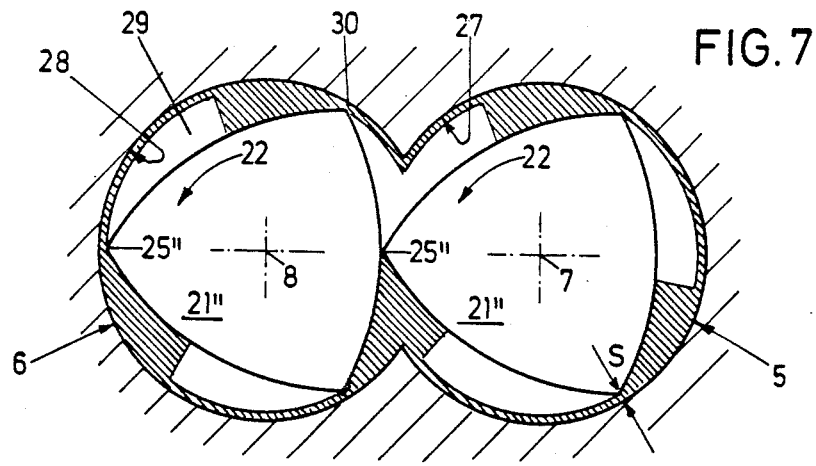
FIG. 7 is a view corresponding to FIGS. 5 and 6 illustrating the material treatment by the kneading disks in a purely diagrammatic manner.
Figure 8:
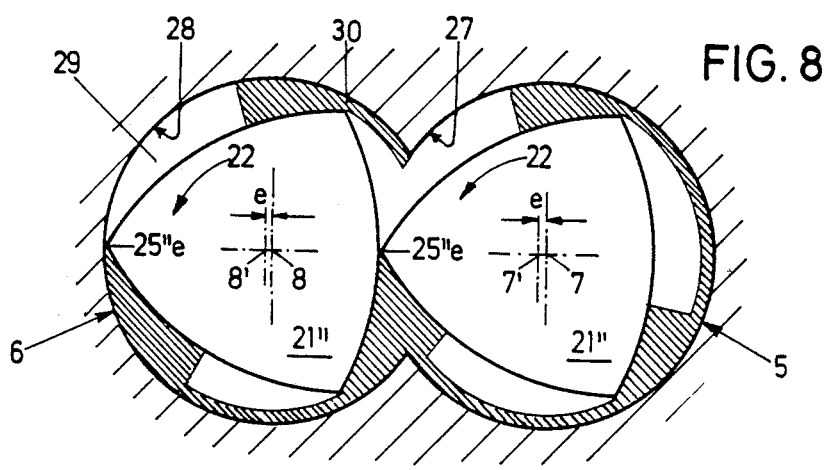
FIG. 8 shows, diagrammatically, a construction similar to FIG. 7 but with eccentrically displaced kneading disks.

The diagrammatic views of FIGS. 7 and 8 show the action mechanism of the crest clearance s according to the invention. In the case of the kneading disks 21" of FIGS. 7 and 8, crests 25" are shown pointed in order to simplify the drawing, i.e. with a crest or generating angly o. The disks 21" rotate counterclockwise in accordance with the rotation direction arrows 22 and move past one another in self-cleaning manner, i.e. with reciprocal engagement in the penetration area of bores 5, 6. The flights 29, in each case formed between two adjacent crests 25", contain material to be worked, and which builds up upstream of the lagging crest in the rotation direction 22. In FIGS. 7 and 8, the material is indicated by fine haching. As a result of the friction against the stationary casing wall 27, 28, the material is circulated in the particular flight 29 and simultaneously sheared by the gap 30 formed by the crest clearance s flowing with a relatively low flow speed in a thin layer against the casing wall 27 or 28. This layer is subject to an intense interchange with the following material so that theoretically the residence time of the material is increased somewhat, but there is simultaneously more intense, more careful and less energy-costly treatment of the material.

The construction of FIG. 8 differs from that of FIG. 7 only in that the two kneading disks 21" are displaced with a small eccentricity e, so that the axes 7' and 8' are displaced by an amount e relative to the axes 7, 8 of the bores 5, 6 which is equal to or smaller that the crest clearance s. As a result of such an eccentricity e, a crest 25"e moves past the casing wall 27 or 28 and also cleans the latter, as can be seen from FIG. 8 in the in each case left-hand upper area of bores 5, 6. In this case, a complete self-cleaning system is provided.

Figure 9:
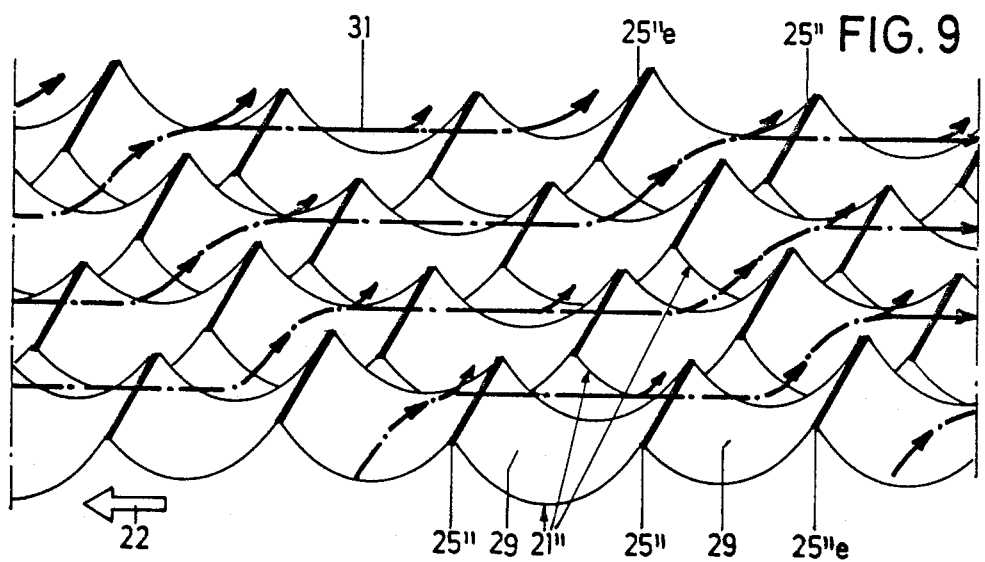
FIG. 9 shows a development of several kneading disks combined to form a kneading block (according to FIG. 8) with a view of the material movement.

FIG. 9 shows several axially succeeding kneading-disks 21" in an eccentric arrangement corresponding to FIG. 8, said kneading disks 21" being tangentially displaced relative to one another, as shown in FIG. 3. The material to be treated moves in accordance with the material movement arrow 31 over the crests 25", i.e. it is sheared by the gap 30 formed there (cf. FIG. 8). The material builds up in front of the crest 25"e, which has virtually no clearance with respect to the casing wall and is axially passed into the associated flight 29 of the next kneading disk 21". As can be gathered from FIG. 9, the arrangement is such that after the material has passed into the area of the axially adjacent kneading disk 21", it is again sheared by means of two crests 25" with an adequate clearance relative to the casing wall, before it is again positioned upstream of the clearance-free crest 25"e. As can be seen from FIG. 9, also a small part of the material built up in front of a gap 30 is axially passed into the associated flight 29 of the next kneading disk 21".

Figure 10:
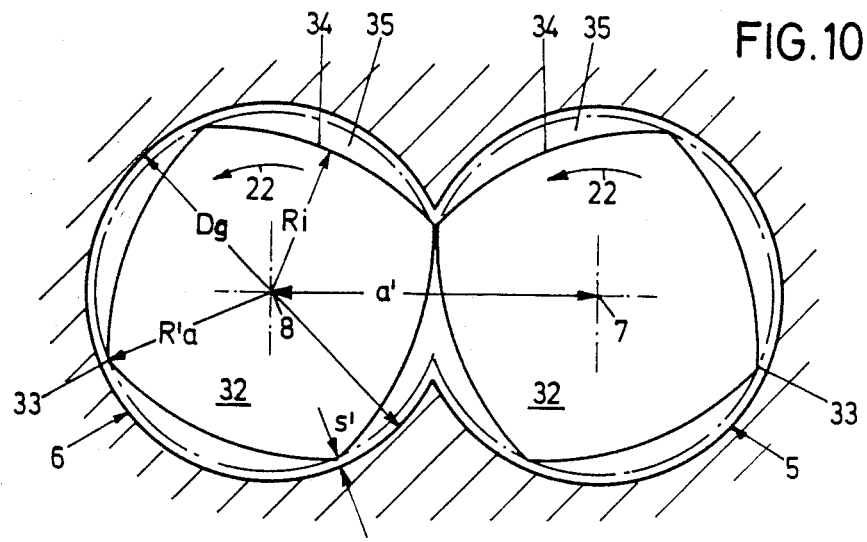
FIG. 10 is a vertical section through the kneader shown in FIG. 1 with four-flight kneading disks.
Figure 11:
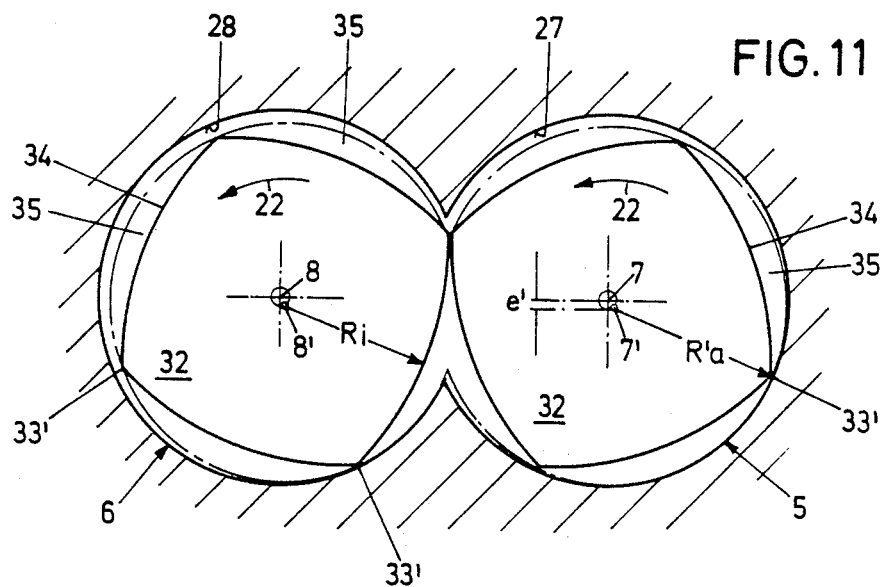
FIG. 11 is a view corresponding to FIG. 10 but with eccentrically displaced kneading disks.

FIGS. 10 and 11 show four-flight constructions of kneading disks 32. These each have four crests 33 arranged with the same angular distances with respect to one another and also rotate in the same direction in accordance with the rotation direction arrows 22. Here again, the diameter Dg of the bores 5, 6 is equal to twice the crest clearance s plus twice the radius R'a of the crests 33. With regard to the spacing a' of the axes 7, 8 of the bores 5, 6, once again a'=R'a+Ri, Ri corresponding to the smallest radius of the kneading disks 32, i.e. the distance between the axis 7 or 8 and the centre between two crests 33 on the curved section 34 connecting them. Once again flights 35 are formed between two adjacent crests 33 in each case. In the construction of FIG. 10, there is reciprocal cleaning of adjacent kneading disks in one plane. The construction of FIG. 11 corresponds to that of FIG. 10 and, as in FIG. 8, the axes 7' and 8' of the kneading disks 32 are displaced by an eccentricity e' relative to the axes 7, 8, so that once again in each case crest 33' is moved in clearance-free manner along the casing wall 27 or 28, so that a completely self-cleaning system is formed. If all the remaining dimensions stay unchanged, the crest clearance of the remaining crests 33' is increased compared with the clearance s', which also applies to the construction according to FIG. 8 compared with that of FIG. 7. Here again, the crests 33 can be constructed as in FIG. 5 or FIG. 6.

In all these cases, the crests 25, 25', 25" or 33 can have a positive or negative pitch, i.e. can exert an axial conveying momentum in the normal conveying direction 36 or a back conveying momentum on the material.

Figure 2:
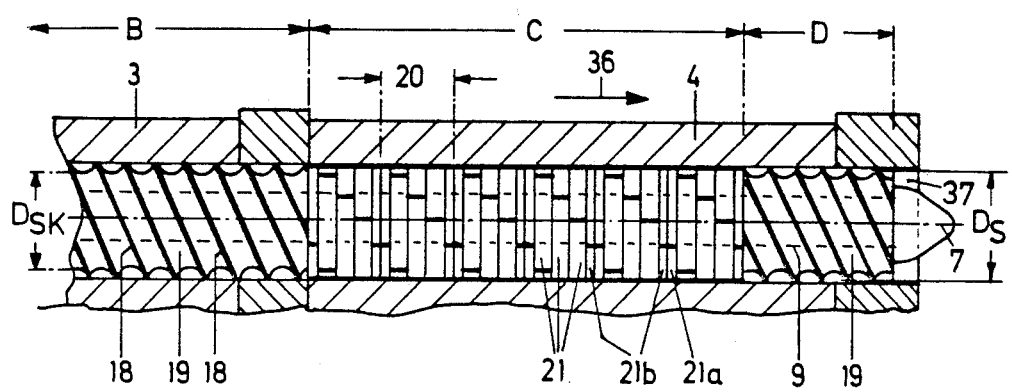
FIG. 2 is a vertical partial section through the kneader shown in FIG. 1.

As can be gathered from FIG. 2, a relatively large number of kneading disks 20 can be arranged in axially succeeding manner. The melting zone (kneading zone C) formed in the casing portion 4 is followed by the discharge zone serving as melt-conveying zone D, and then by an outlet 37.

The width of the kneadings disks 21, i.e. their axial extension is in the range 0.3 to 4×(Ra−Ri), Ra−Ri being the thread depth.

For all the embodiments, the casing wall 27, 28 of the corresponding bore 5, 6 must be so dimensioned relative to the n-flight kneading disks 21, 21', 21", 32 for producing a definite crest clearance s, s' between the casing wall 27, 28 and kneading disks 21, 21', 21", 32 that $$\frac{Dg}{a} \geq \frac{1}{\cos\frac{\pi}{2n}}$$

in which
 Dg=diameter of bores 5, 6
 a=centre-to-centre distance of bores 5, 6
 n=number of flights of each kneading disk 21, 21', 21" or 32.

For the embodiments according to FIGS. 5, 6 and 7, n=3, whilst for the embodiments according to FIGS. 10 and 11 n=4.

Figure 12:
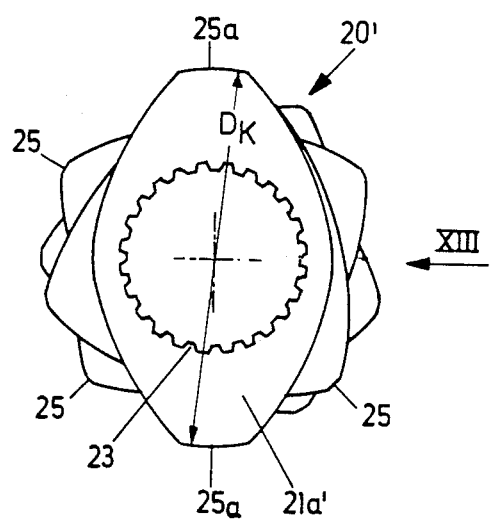
FIG. 12 is a front view of a modified embodiment of several kneading disks combined in a kneading block taken in the direction of the arrow XII in FIG. 13.

As can be gathered from FIG. 12, in a kneading block 20' the first kneading disk 21a', namely the kneading disk having only half the axial extension as compared with the other kneading disks 21, is formed with a cross-section differing from that of the remaining kneading disks 21. I.e. it has only so many crests 25a, as the screw bodies 19 in the solid material conveying zone B, respectively in the melt conveying zone D have screw thread flights 18. In general, the relation between the number N of the screw thread flights 18 and the number n of the flights of each kneading disk is $1 \leq N \leq n-1$.

In the present case the kneading disks 21 have 3 flights and the screw bodies 19 have two flights. The kneading disk 21' has thus the same number of flights as the screw bodies 19 have screw thread flights 18. The first kneading block 20 of the kneading zone C can then be arranged in such a way that the crests 25a of its kneading disk 21a' are in alignment with the two screw thread flights 18 of the screw body 19 in the solid material conveying zone B, which allows for a simple and loss-free passage of the material into the kneading zone C.

In the same manner such kneading block with such a modified kneading disk 21a' may be arranged at the passage from the kneading zone C to the melt conveying zone D, thus allowing for the same almost loss-free material flow.

This kneading disk 21a' has a large diameter $D_K$ from crest 25a to crest 25a, which is nearly the same as the diameter $D_S$ of the screw thread flights 18 of the screw bodies 19, so that there remains a normal clearance in the range of 0.001 Dg to 0.005 Dg. In the solid material conveying zone B and the melt conveing zone D a cleaning of the casing wall 27, 28 is thus effected.

Figure 13:
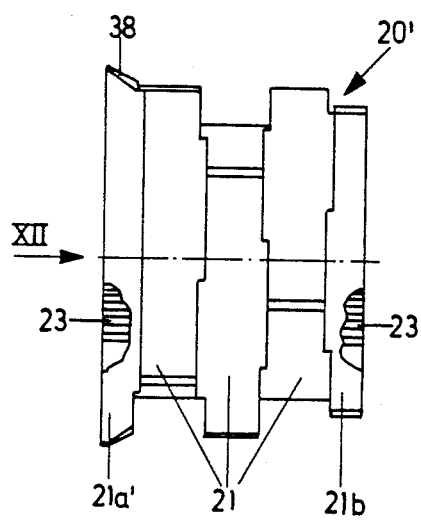
FIG. 13 is a side view of the kneading block taken in the direction of the arrow XIII in FIG. 12.

As can be gathered from FIG. 13, the crests 25a of the kneading disk 21a' forming a connecting kneading disk are provided with bevellings 38 which are directed towards the remaining kneading disks 21. The kneading disk 21a' of which the cross-section is adapted to that of the screw body 19 forms an adapter element and facilitates the passage with little pressure loss of the material from the solid material conveying zone B to the kneading zone C and from there to the melt conveying zone D.

The kneading disks 21a, 21b resp. 21a' arranged at the front of each kneading block 20, which have only half the axial width of the kneading disks 21, improve the selfcleaning and the supporting effect against the transverse forces acting in each case on the outside of the kneading blocks by the material to be melted.

This embodiment of the kneading blocks with the kneading disks 21a, 21b resp. 21a' is in particular used with plastics which are strongly adhesive and tend to decomposition, such as polyvinyl chloride, polycarbonate, polybutadienterephtalate, polyamide, polyoxilenemethacrylate.

Figure 14:
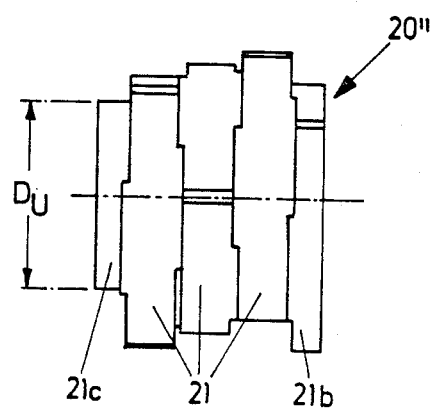
FIG. 14 is a side view of a further modified embodiment of a kneading block.

In other cases, as for example with polyolefines and polystyroles, it is sufficient according to FIG. 14 to provide as a passage from the screw body 19 to a kneading block 20", resp. from the last kneading block 20" to a screw body 19, an adapter element 21c, in which a kneading disk 21a, resp. 21b, resp. 21a' of half the axial width according to FIG. 13 is given cylindrical form by means of milling off or any other appropriate processing technique, the diameter $D_U$ of which cylindrical form equalling the core diameter $D_{SK}$ of the screw bodies. This core diameter is the diameter at the bottom of the screw thread flights 18. This kneading block 20" is apart from that constructed in the same way as the other kneading blocks.

The smaller crest clearance s is preferably used with material of low viscosity, the larger crest clearance is preferably used with highly viscous material. In so far crest clearances of 0.06 to 0.09×Ra may also be appropriate.

The invention is not restricted to the above-described embodiments but variations and modifications may be made without departing from the spirit and scope of the invention as defined by the appended claims.

What is claimed is:

1. A co-rotating twin-screw kneader for kneading thermoplastic material comprising a casing having two essentially axially parallel bores defined by the casing wall and which intersect with one another in a region to form gussets in said casing wall adjacent the intersecting region; two essentially axially parallel shafts arranged to be driven in the same direction of rotation, each shaft being arranged in a respective one of said bores; at least one screw body having at least one screw thread flight for conveying said material in a conveying direction and being mounted on a part of the length of each shaft; multi-flight kneading disks each having a plurality of crests mounted on a part of the length of each shaft provided behind said screw body with respect to said conveying direction, each said disk on one shaft being associated with another said disk on the other shaft in a plane perpendicular to the axes of said shafts and said disks being arranged to be moved past one another in a virtually clearance-free manner in the intersecting region of said bore to self-clean said disks; each multi-flight kneading disk having a radius Ra measured from its center to its crest, said casing wall and said kneading disks being sized to provide a clearance between said casing wall and said kneading disk crests of approximately 0.03 to 0.09 Ra, and wherein $$\frac{Dg}{a} \geq \frac{1}{\cos\frac{\pi}{2n}}$$

in which
Dg=diameter of the bores;
a=center-to-center distance of the bores
n=number of flights on each kneading disk;
and in which the number N of the screw thread flights of each screw body is $1 \leq N \leq n-1$ and in which the clearance between the casing wall and the at least one screw thread flights is approximately 0.002 to 0.01 Ra to clean the casing wall.

2. A co-rotating twin-screw kneader as claimed in claim 1, in which each kneading disk is provided with three flights whereby $$\frac{Dg}{a} \geq 1.155$$

3. A co-rotating twin screw kneader as claimed in claim 1, in which the clearance between the casing wall and the crests on the kneading disks is approximately 0.06 to 0.09 times the radius of the kneading disks to said crests.

4. A co-rotating twin-screw kneader as claimed in claim 1, in which the axes of said kneading disks are aligned, respectively, with the axes of said bores in the casing.

5. A co-rotating twin-screw kneader as claimed in claim 1, in which the axes of said kneading disks are arranged with an eccentricity with respect to the axes of said bores in the casing.

6. A co-rotating twin-screw kneader as claimed in claim 1, wherein between the at least one screw body and an adjacent kneading disk is arranged an adapter element.

7. A co-rotating twin-screw kneader as claimed in claim 6, wherein said adapter element has a number of crests equal to the number of screw thread flights of said screw body.

8. A co-rotating twin-screw kneader as claimed in claim 7, wherein the kneading disk forming an adapter element is provided with bevellings sloping in the direction towards the adjacent kneading disks.

9. A co-rotating twin-screw kneader as clained in claim 6, wherein the adapter element is formed as a cylinder with a diameter equalling a core diameter of the screw body.

* * * * *